United States Patent [19]

Crowley

[11] Patent Number: 5,273,516
[45] Date of Patent: Dec. 28, 1993

[54] METHOD AND APPARATUS FOR BUSINESS FORMS PROCESSING

[75] Inventor: H. W. Crowley, Newton, Mass.

[73] Assignee: Roll Systems, Inc., Burlington, Mass.

[21] Appl. No.: 832,097

[22] Filed: Feb. 6, 1992

[51] Int. Cl.⁵ .................................. B65H 29/00
[52] U.S. Cl. .......................... 493/416; 414/789.2; 414/790.4; 414/790.5
[58] Field of Search .................... 493/405–416, 493/357–360, 436; 414/789.2, 789.3, 789.4, 789.8, 790.4, 790.6, 790.5; 211/49.1, 50, 51, 52, 53; 271/149, 151, 152, 153

[56] References Cited

U.S. PATENT DOCUMENTS

| | | | |
|---|---|---|---|
| 3,851,773 | 12/1974 | Kluge | 414/790.6 |
| 3,883,131 | 5/1975 | Anderson, Jr. | 493/416 |
| 3,887,088 | 6/1975 | Fernandez-Rana | 414/789.2 |
| 3,974,921 | 8/1976 | Tokuno | 414/789.2 |
| 4,103,786 | 8/1978 | Tokuno | 414/789.2 |
| 4,197,045 | 4/1980 | Stauber | 414/790.5 |
| 4,429,889 | 2/1984 | Westra | 211/50 |
| 5,061,233 | 10/1991 | Schultz | 493/410 |

*Primary Examiner*—Jack Lavinder
*Attorney, Agent, or Firm*—Wolf, Greenfield & Sacks

[57] ABSTRACT

A system for stacking continuous folded forms coming from a folder and moving to a conveyor. A table is position adjacent and in line with the conveyor and in a position for receiving a horizontal stack of folded forms disposed on the table top. The table is a tiltable table and is able to be tilted from a substantially horizontal position to a substantially vertical position to likewise move the stack from a horizontal to a vertical stack position. A cart is movable to a position adjacent to the tilted table for receiving from the table the vertical stack for support on the cart.

34 Claims, 5 Drawing Sheets

METHOD AND APPARATUS FOR BUSINESS FORMS PROCESSING

BACKGROUND OF THE INVENTION

The present invention relates in general to a method and apparatus for the processing of business forms. More particularly, the present invention relates to a system for stacking continuous folded forms. Even more particularly, the present invention relates to a unique combination of elements used in such a system employing a tiltable table in combination with a stack cart or stack rack.

There are various ways of processing folded forms particularly between an initial folding operation and subsequent finish operations. However, existing transfer systems tend to be rather complex in construction and have rather limited capacity.

It is an object of the present invention to provide a forms transfer system that has an improved capacity and in particular in which a stack rack is used having a capacity of 50,000 forms or more.

Another object of the present invention is to provide an improved system for stacking continuous folded forms in which there is far less frequent intervention by an operator. In accordance with the present invention there is a minimizing of handling of the forms thus minimizing maintenance problems associated with the system.

Still another object of the present invention is to provide a cart system in which the cart is far more space efficient than prior carts. In accordance with the present invention for a particular square footage of coverage of the cart there is a forms capacity far in excess of that previously obtainable.

Another object of the present invention is to provide an improved system for stacking continuous folded forms and associated improved stack rack or stack cart that is relatively inexpensive, of relatively simple construction and one requiring minimal maintenance.

Still another object of the present invention is to provide an improved storage cart for folded forms and one in which it is readily adapted for use with utilization equipment such as feed inserting equipment.

SUMMARY OF THE INVENTION

To accomplish the foregoing and other objects, features, and advantages of the invention there is provided in accordance with the present invention a system for stacking continuous folded forms. The system of the present invention is characterized by simplicity, versatility, flexibility, cost, cost effectiveness, and space efficiency. The system employs a unique combination of elements that enables folded forms to be conveyed, accepted on a tiltable table and then readily transferred to a stack rack or stack cart.

In accordance with the present invention the system may be considered as comprising a folder for folding the forms along fold lines, a conveyor and means for positioning the conveyor adjacent the folder so that the folded forms from the folder are received on and moved along the conveyor. A table is provided having a table top support surface. The table is positioned adjacent and in line with the conveyor and in a position for receiving a horizontal stack of folded forms that are moved by the conveyor and positioned on the table top support surface. In accordance with the embodiment disclosed herein, a flap may bridge between the conveyor and the table which flap is maintained flush with the top surfaces of the conveyor and the table so that the forms pass readily from the conveyor onto the table.

The system of the present invention also provides means for enabling tilting of the table from a substantially horizontal position to a substantially vertical position to in turn move the stack from a horizontally disposed stack to a vertically disposed stack. In the embodiment disclosed herein, associated with the table is a end wall at the end of the table remote from the conveyor and a sliding door at the end of the table adjacent to the conveyor. The sliding door, when the table is in a horizontal position may be disposed depending downwardly but may be moved to an upward position to in essence form an opposite end wall for retaining a stack of folded forms on the table between these end walls. The sliding doors, once the stack is moved to a vertical position functions as resting surface for the stack.

Moreover, in accordance with the system of the present invention there is provided a stack rack or a stack cart. This is movable such as by means of wheels or casters on it and is compartmentalized so as to receive preferably a plurality of these vertical stacks. For this purpose the stack cart is movable to a position adjacent the tilted table, once tilted, for receiving from the table the vertical stack for support on the cart.

In the embodiment of the invention disclosed herein, the cart has a bottom resting surface and vertically disposed walls preferably defining four separate compartments for accommodating vertical stacks. Each of these compartments may also be provided with one or more shelves so as to accommodate stacks of different height. As also indicated previously, the cart is readily rotatable so that once one stack has been loaded the cart can be easily rotated to receive a further stack from the table once the table receives the stack and is tilted.

DETAILED DESCRIPTION

The drawings in this application illustrate a preferred embodiment for a novel system for stacking continuous folded forms. The system basically employs at least two main elements, one being a table that is adapted to receive forms from a conveyor, and which table is tiltable; and a stack rack or stack cart that is adapted to receive preferably multiple stacks from the table.

Figure 1:
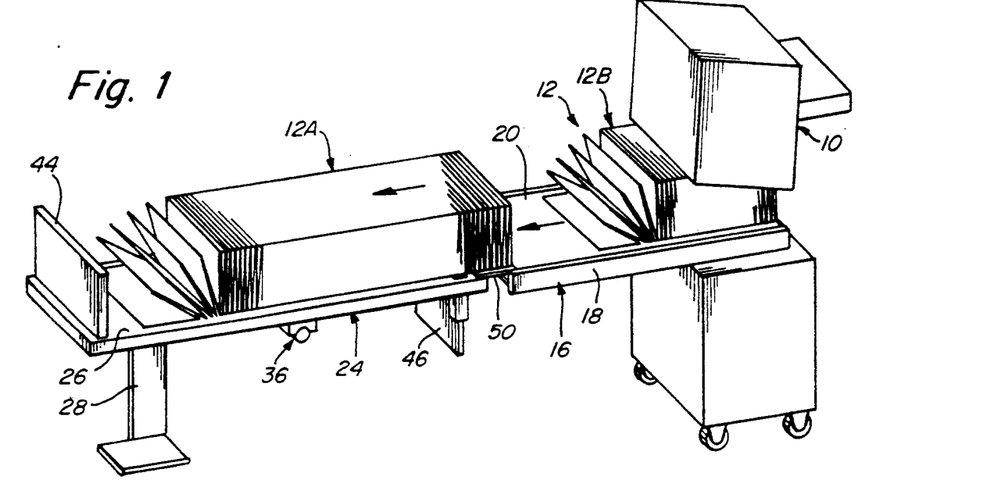
FIG. 1 is a perspective view illustrating a portion of the system of the present invention illustrating a new run coming out of the folder and moving forward on the conveyor as well as a run that is almost totally disposed on the table.

FIGS. 1-7 herein are perspective views that illustrate the sequences of events that occur in connection with the use of the apparatus and method of the present invention. Generally speaking, FIG. 1 shows a finished run that is almost completely disposed on the tilt table and a new run coming out of the folder and moving forward on the conveyor. The run that is on the table has just passed off of the conveyor and will then stop moving.

Figure 2:
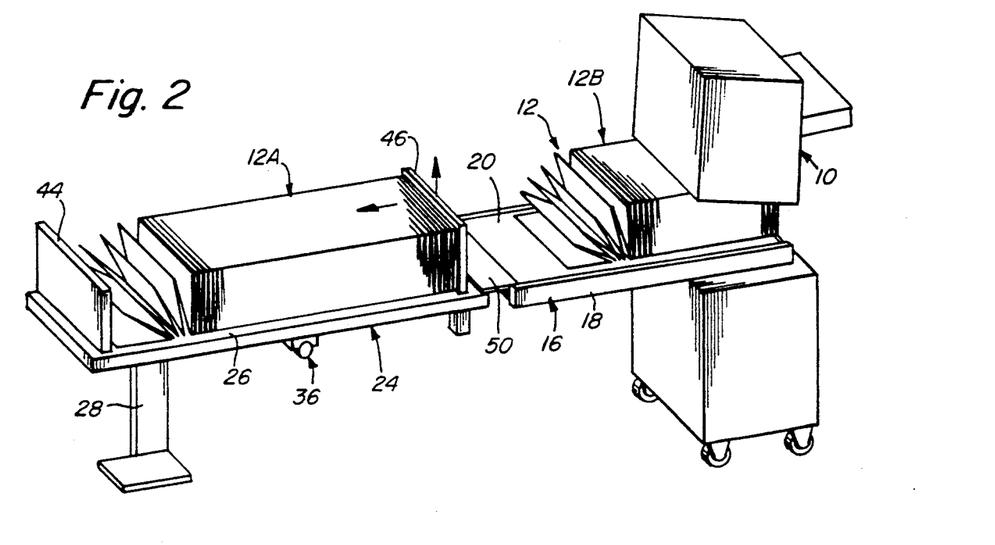
FIG. 2 is a perspective view similar to that shown in FIG. 1 but now illustrating a next step in which the sliding door is moved into position for retaining the stack on the table.

FIG. 2 shows the run shoved over enough to allow the sliding door to come up against the last sheet. This sliding door operation can be carried out manually or some type of automatic system could be employed.

Figure 3:
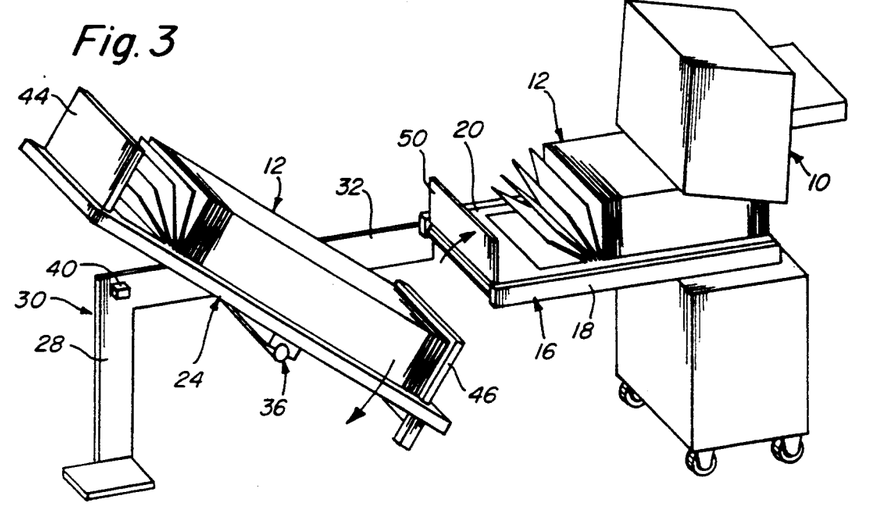
FIG. 3 is a perspective view showing the flap on the conveyor flipped up and with the table being partially tilted.
Figure 4:
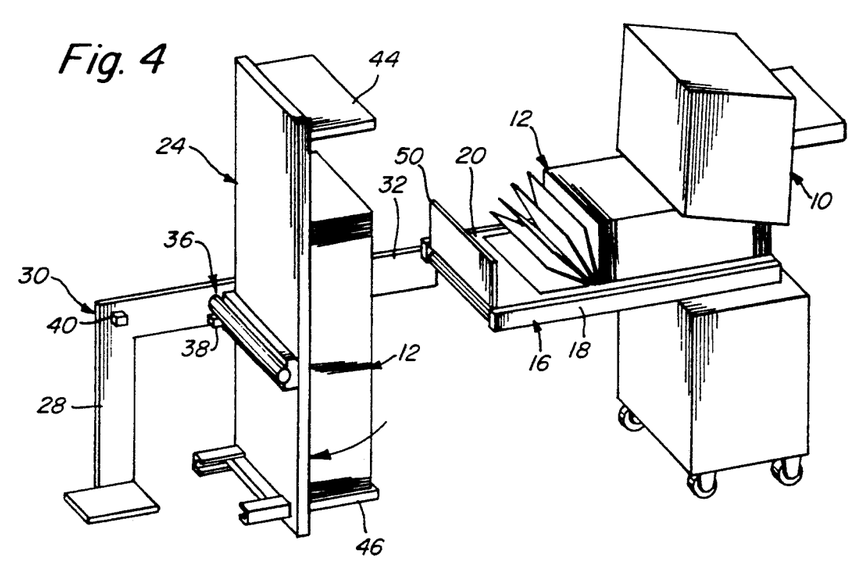
FIG. 4 is a perspective showing the table now completely tilted to a vertical position.
Figures 5, 6:
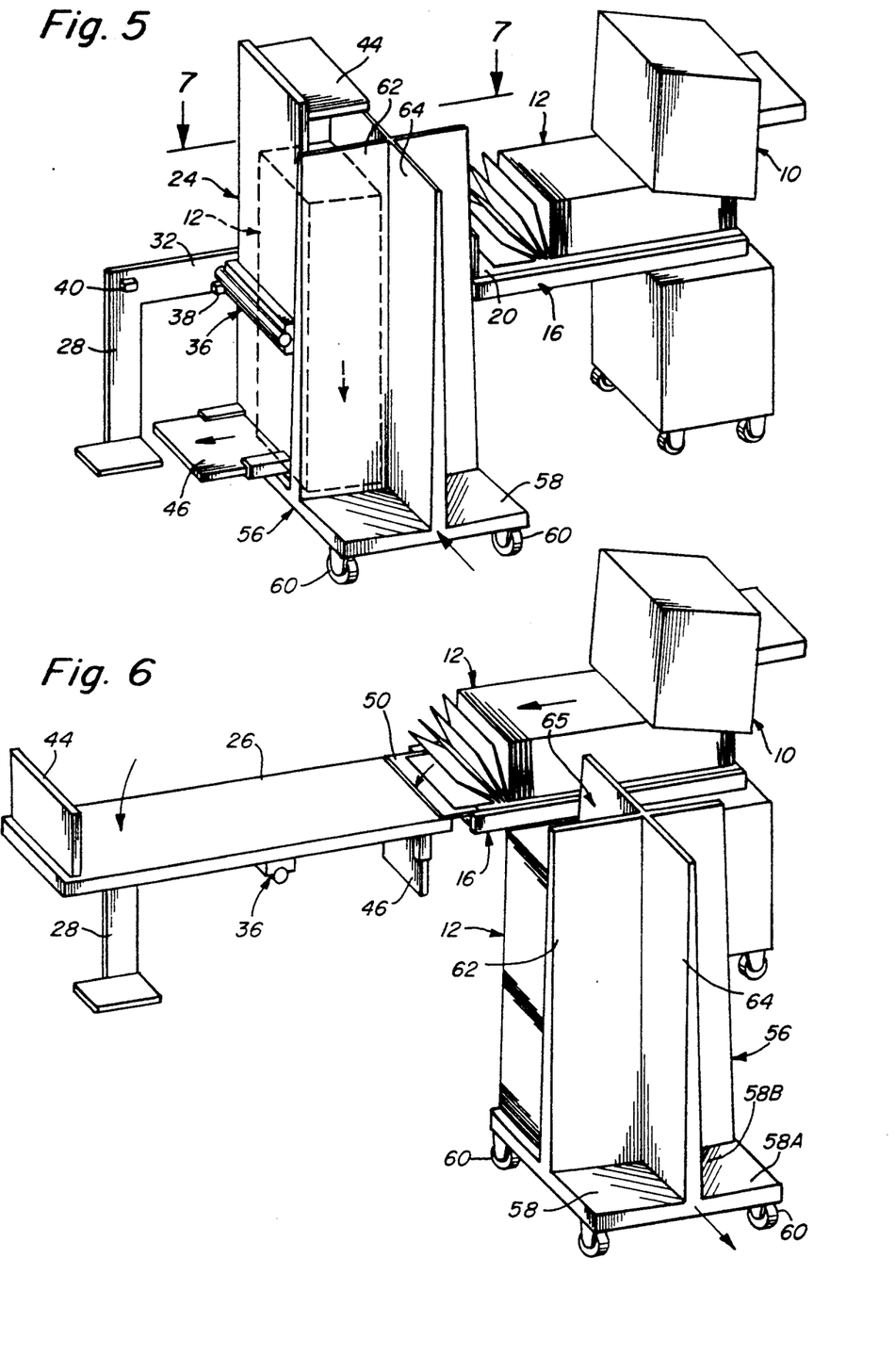
FIG. 5 is a perspective view illustrating the table substantially in the position of FIG. 4 but with the door withdrawn as illustrated after the stack cart has been moved into position.
FIG. 6 is a perspective view illustrating the table being moved back to it horizontal position with the flap engaged between the conveyor and the table and with a new group of forms now being conveyed onto the table.
Figure 8:
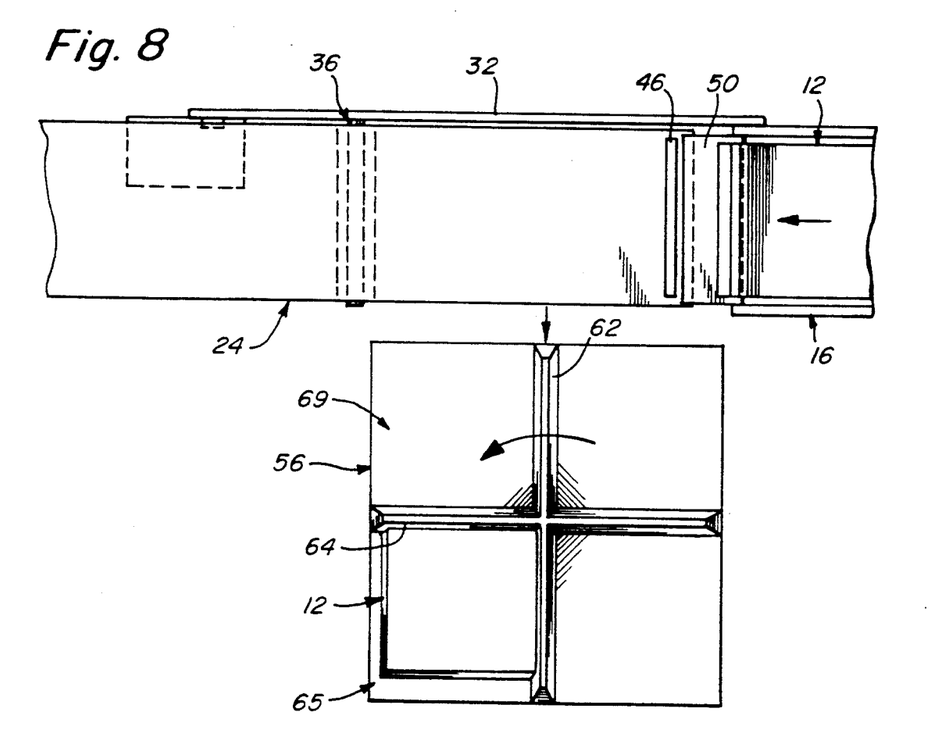
FIG. 8 is a top plan view showing the rack pulled out an rotated with another empty bay ready for the next run which is passing over the flap and about to pass over the end of the sliding door which is now flush with the surface of the tilt table.

FIGS. 2-5 show the new run slowly progressing out of the folder. FIG. 3 shows the stack partially tilted while FIG. 4 shows the stack in its fully tilted vertical position. FIG. 5 shows the cart engaging with the stack and FIG. 6 shows the cart after having received the stack being moved away so that it can be rotated such as is illustrated in FIG. 8.

With more particular reference to the structure illustrated in the drawings, there is provided a folder 10 that folds the forms into the folded form illustrated in the drawings. The folded forms are shown at 12.

Associated with the folder 10 is a conveyor 16 which may have fixed side walls 18 and a conveying belt 20. The conveyor 16 conveys the forms 12 therealong. In FIG. 1 there is actually illustrated a first stack 12A that has already progressed to the tilt table 24 and a stack 12B that is still progressing along the conveyor 16.

The tilt table 24 has a table top support surface 26 and in the embodiment illustrated herein is comprised of only a single leg 28 although the table could be supported by more than one leg. As illustrated in FIGS. 3 and 4 there is a support bracket 30 that has leg 28 as one member and a further support leg 32 that may fasten to a side of the conveyor 16.

As has been indicated previously, the table 24 is a tiltable table and for this purpose there is provided at the bottom of the table flat surface a pivot mechanism 36 illustrated perhaps best in FIG. 4. This pivot mechanism is supported from the leg 32 of the bracket 30.

Associated with the table are stops. There is a stop 38 illustrated in FIG. 4 that controls the vertical position of the table. There is also a stop 40 illustrated in FIG. 4 that controls the horizontal position of the table 24.

At an end of the table surface 26 remote from the conveyor there is provided an upright end wall 44. This may be permanently fixed in position and simply prevents the stack from falling off that end of the table. The tilt table may also have side walls extending the longitudinal length thereof. Such side walls are not illustrated in the drawings herein.

At the end of the table surface 26 close to the conveyor 16 there is provided a sliding door 46. The door 46 may have detent positions associated therewith so that it can be slid but held in alternate positions. In this regard, in FIG. 1 the door 46 is shown depending downwardly so that the top surface thereof, such as illustrated in FIG. 8, is essentially flush with the table surface 26. In this way, the sliding door is not at all interfering with the progress of the stack 12A as it is moved from the conveyor onto the tilt table. FIG. 2 on the other hand shows the door 46 moved to its upper position whereby detent means or the like it can be retained in that position.

FIGS. 1 and 2 also illustrate a flap 50 that is adapted to bridge between the conveyor 16 and the table 24. The flap 50 is pivotal between a position such as that illustrated in FIG. 2 and that illustrated in FIG. 3. In the position of FIG. 2 the flap 50 has its top surface flush with the top of the conveyor surface namely surface 20 and the top of the table or surface 26. In this way, forms that progress along the conveyor are not at all impeded by the flap but simply pass over the flap.

The flap 50 may also also be moved to an upright position as illustrated in FIGS. 3 and 4. In its uprights position the flap 50 may prevent the forms on the conveyor 16 from progressing any further than the position of the flap.

In FIG. 1 the stack 12A has progressed to a point where the conveyor is no longer moving it. The rear end of the stack overlies the flap 50. The sliding door 46 is in its downward position. The front end of the stack may be against the wall 44 or spaced from it as illustrated in FIG. 1.

After the position of FIG. 1, in FIG. 2 the operator may move the stack 12A to the left as illustrated by the arrow and the door 46 is then moved upwardly as also illustrated by the arrow. The door 46 now functions as an opposite end wall so to speak and when the table 24 is tilted it will be seen that the door 46 functions as a base rest surface for the stack 12A. In FIG. 2 the flap 50 is still in its horizontal position.

FIG. 3 no illustrates the flap 50 moved upwardly so as to prevent any further forms from progressing off of the conveyor. Also, in FIG. 3 the table 24 is shown being partially tilted. In FIG. 4 the table has been tilted to its full vertical position whereby the associated stack 12 supported on the table is also in a vertical stack. Note in both FIGS. 3 and 4 that the door 46 is in a position where it functions as a resting surface for the bottom of the stack. In FIGS. 3 and 4 the flap 50 is also maintained in its upright vertical position.

With regard to FIGS. 3 and 4 it is noted that the table 24 is illustrated as being rotated clockwise. Similarly, the table can be rotated counterclockwise. In other words, the table can pivot in either direction. If the table is pivoted in a counterclockwise direction then the endwall 44 functions as a rest surface for the bottom of the stack.

Figure 7:
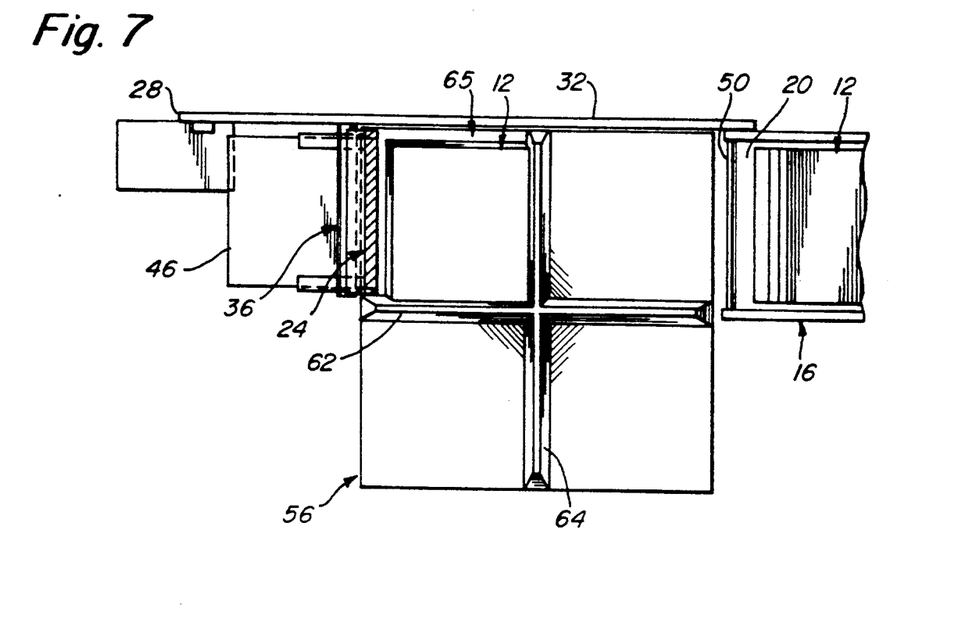
FIG. 7 is a cross sectional view taken along line 7—7 of FIG. 5.

FIG. 5 illustrates the tilt table 24 in the same position as in FIG. 4. The stack 12 is shown in dotted outline. However, FIG. 5 also illustrates the stack rack or stack cart 56 of the present invention. The cart 56 has a base 58 that is supported by four rollers or casters 60. Supported from the base 58 are crossed walls 62 and 64 which define four separate vertically disposed compartment as clearly illustrated in FIGS. 5 and 6. These compartments are also illustrated in FIGS. 7 and 8 such as the compartment 65 that receives the stack 12.

The walls 62 and 64 may be tapered slightly such as illustrated in FIGS. 5 and 6 or they may be straight vertical walls extending from the base. The base 58 in each compartment is preferably tilted such as from a front edge 58A slightly downwardly to a more rear edge 58B (see FIG. 6). This tilting of the base of the cart toward the center assists in holding the stacks in a more stable position on the rack.

FIG. 5 illustrates the cart 56 having been moved into position. The base 58 of the cart is positioned essentially under the sliding door 46 so that there is no interference between the cart and the table 24. It is noted in FIG. 5 that for example, the wall 62 of the cart engages the side of the table as the table is in its vertical position. The door 46 is then slid in the direction of the arrow so as to disengage from the bottom of the stack 12. The stack 12 is then resting upon the base 58 of the cart 56.

The cart 56 may then be moved away from the table such as to the position of FIG. 6. FIG. 6 also illustrates the table being moved in the direction of the arrow in FIG. 6 so that the table is now again in a horizontal position and is ready for the receipt of a further stack. Note in FIG. 6 that the flap 50 is moved downwardly so that the conveyor can now operate to move the next stack onto the table 24.

Thus, in FIG. 6 the cart is shown with only a single stack on it and in a position moved away from the tilt table. FIG. 7 is a cross sectional view taken along line 7—7 of FIG. 5 and thus illustrates the position in a plan view of the cart relative to the tilted table. FIG. 8 illustrates the cart 56 now rotated in the direction of the arrow so that a new compartment 69 may be moved into position to receive a subsequent stack off of the tilt table.

Figure 9:
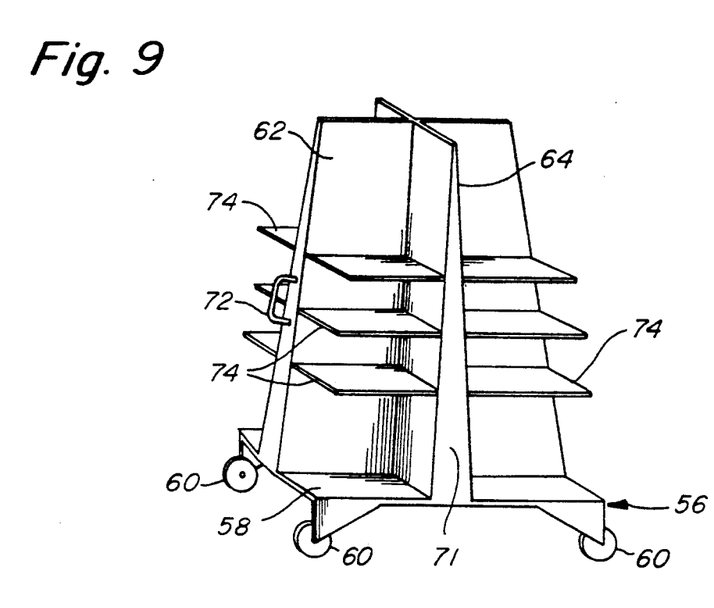
FIG. 9 is a prespective view of an alternate stack cart construction employing removable shelves associated with each compartment.

Reference is also now made to FIG. 9 for an alternate embodiment of the stack rack of the present invention. Once again, this rack is usable to move fan folded or cut-sheet stacks easily and conveniently to the next stop in the output handling sequence. In the embodiment of FIG. 9 the same reference characters are used to identify basically the same components illustrated in the prior FIGURES. However, in the embodiment of FIG. 9 there are twelve removable shelves 74 as well as four fixed base shelves 58. These removable shelves in particular allow varying height stacks to be accommodated on the cart.

The cart in accordance with the present invention has a substantially large capacity. It can stock as much as five hours or more of production or, for example, up to 10,000 16-pound 18.5×12 inch pages. This cart occupies in one embodiment approximately only 6.9 square feet. In addition to the casters 60 that are employed it also preferably has at least one handle 72. All of the shelves that are employed are preferably slanted inwardly so as to keep the stacks square. The cart is made of solid, rugged construction. It is preferably made of a heavy gauge welded steel.

Also noted in FIG. 9 is that the walls are preferable tapered such as illustrated at 71 so as to again provide for more stability in holding the stacks of folded or cut-sheet material.

In the foregoing description, reference has been made primarily to the use of the present invention as it pertains to business forms and in particular folded forms. However, the concepts of the present invention may also be employed in connection with the processing of cut sheets.

Having now described a limited number of embodiments of the present invention, numerous other embodiments and modifications thereof are contemplated as falling within the scope of the present invention as defined by the appended claims.

What is claimed is:

1. A system for substantially vertically stacking continuous folded material comprising:
   a folder for folding the material along fold lines, a conveyor having a conveyor surface, said conveyor being positioned adjacent said folder so that the folded material from said folder is received on and moved along said conveyor in a downstream direction,
   a table having a table top support surface,
   a support bracket that supports the table top support surface adjacent and in line with to the conveyor surface and in a position for receiving a horizontal stack of folded from the conveyor,
   said support bracket including a pivot mechanism positioned along the table top and having a pivot axis substantially transverse to the downstream direction so that said table pivots from a substantially horizontal position to a substantially vertical position to likewise move the stack from a horizontal to a vertical stack position,
   at least one retractable backing surface substantially transverse to a plane defined by the table top that supports a bottom of the stack when the table is pivoted to a substantially vertical position,
   and a cart movable to a position adjacent said tilted table for receiving from said table said vertical stack, wherein the retractable backing surface is retracted to allow the vertical stack located thereon to be received from said table.

2. A system as set forth in claim 1 including a flap disposed for bridging between said conveyor and table.

3. A system as set forth in claim 2 wherein said flap is supported from said conveyor and pivotal relative thereto.

4. A system as set forth in claim 1 wherein said table has a sliding door at one end thereof.

5. A system as set forth in claim 4 wherein said sliding door is disposed at an end of said table adjacent said conveyor.

6. A system as set forth in claim 5 wherein said sliding door has a first position in which it is disposed under said table top support surface and a second position in which it extends over the table top support surface for holding an end of a stack of folded material disposed on the table.

7. A system as set forth in claim 6 including an end wall on the table at an end of the table remote from the conveyor.

8. A system as set forth in claim 1 wherein said support bracket comprises a vertical leg and a horizontal leg, the horizontal leg extending from the conveyor, said horizontal leg lying substantially within a plane defined by the conveyor surface to support the table surface in line with the conveyor surface.

9. A system as set forth in claim 8 wherein the support bracket has first and second stops for limiting of the vertical and horizontal positions of said table.

10. A system as set forth in claim 1 wherein said table has a sliding door that can be moved to hold one end of the stack and wherein, when said tilt table is in its vertical position, the cart may be moved to a position wherein the support system of the cart is under the sliding door, said sliding door being movable to disengage from the stack so that the stack can then be supported only on the cart base support surface.

11. A system as set forth in claim 1 wherein said cart has a base surface that is tilted downwardly from a peripheral edge toward an inner side of the base.

12. A system as set forth in claim 11 wherein said cart has a plurality of upstanding walls defining a plurality of separate compartments for receiving each a vertical stack.

13. A system as set forth in claim 12 wherein said upright walls form a cross shape defining four separate compartments.

14. A system as set forth in claim 13 wherein the upright walls are tapered to be narrower at the top than at the bottom.

15. A system as set forth in claim 1 wherein said cart has upright walls defining a plurality of separate compartments for each receiving a stack.

16. A system as set forth in claim 15 wherein each compartment has at least one shelf disposed therein so as to accommodate stacks of different height.

17. A system as set forth in claim 16 wherein each compartment has plural shelves, and the shelves above the base are removable.

18. A system as set forth in claim 16 wherein each of the removable shelves is also tilted inwardly and downwardly to assist in retaining the stack thereon.

19. A system as set forth in claim 1 wherein said table is capable of tilting either clockwise or counterclockwise.

20. A system for substantially vertically stacking continuous folded material comprising:
    a folder that folds the material along fold lines,
    a conveyor,
    means for positioning said conveyor adjacent said folder so that folded material from said folder is received on and moved along said conveyor,
    a table having a table top support surface,
    means for positioning the table adjacent and in line with the conveyor and in a position for receiving a horizontal stack of folded material disposed on said table top,
    said means for positioning the table including means for enabling tilting of said table from a substantially horizontal position to a substantially vertical position to likewise move the stack from a horizontal to a vertical stack position,
    a flap disposed for bridging between said conveyor and table, wherein said flap is supported from said conveyor and pivotal relative thereto and wherein said flap is pivotable between a substantially horizontal position in which the top surface thereof is substantially flush with the conveyor surface and the table top surface and a substantially vertical position that prevents folded material from progressing off of the conveyor, and
    a cart movable to a position adjacent said tilted table that receives from said table said vertical stack for support of said vertical stack on said cart.

21. A system for substantially vertically stacking web material comprising a conveyor for said web material, a table having a table top support surface, the table being positioned adjacent to the conveyor and in a position for receiving a horizontal stack of the web material from the conveyor, a pivot mechanism constructed and arranged to enable movement of the table between a substantially horizontal position to a substantially vertical position to, likewise, move the stack from a horizontal to a vertical stack position, and a retractable backing surface positioned on the table adjacent the conveyor, the backing surface being constructed and arranged so that, in a retracted position, web material can pass from the conveyor onto the table free of obstruction from the backing surface and, in an extended position, the backing surface supports a stack of web located on the table when the table is moved to the substantially vertical position, the backing surface being movable to a retracted position to drop the stack of web material onto an adjacent surface when the table is located in the substantially vertical position.

22. A system as set forth in claim 21 wherein said material is in the form of folded business forms.

23. A system as set forth in claim 21 wherein said material is in the form of cut sheets.

24. A system as set forth in claim 21 further comprising a second backing surface located in a downstreammost end of the table.

25. A system as set forth in claim 21 further comprising a support bracket, the support bracket including a horizontal leg located along a side edge of the table, the pivot mechanism being interconnected with the horizontal leg.

26. A system as set forth in claim 25 wherein the horizontal leg is interconnected with the conveyor.

27. A system for substantially vertically stacking continuous zig-zag folded web comprising:
    a conveyor having a conveyor surface that moves a continuous zig-zag folded web material in a downstream direction;
    a table having a substantially planar table surface, the table being substantially in line with the conveyor surface and positioned adjacent the conveyor surface to receive the zig-zag folded web material from the conveyor;
    a frame that supports the table, the frame including a support bracket;
    a pivot located along the table and interconnected with the support bracket, the pivot having a pivot axis substantially transverse to the downstream direction, the pivot constructed and arranged so that the table pivots from a substantially horizontal position, substantially in line with the conveyor surface, to a substantially vertical position wherein the table surface is substantially transverse to a plane defined by the conveyor surface;
    a first backing surface extending substantially transversely to the table surface and located at a downstreammost end of the table that limits further downstream movement of the folded web material;
    a second backing surface positioned at an upstreammost end of the table, the second backing surface extending substantially transversely to the table surface and being movable between an extended position and a retracted position, the second backing surface being constructed and arranged so that, in a retracted position, the folded web passes thereover from the conveyor free of obstruction by the second backing surface, the second backing surface being constructed and arranged to support the folded web in a vertical stack, with the second backing surface positioned at a bottom of the stack when the table is pivoted to a substantially vertical position; and
    a cart having a base and a vertical wall, the cart further including wheels so that it is portable, the base being located at a height from the ground that is approximately equal to the height from the ground of the second backing surface when the table is pivoted to a substantially vertical position so that the stacks supported thereby can be moved from the backing surface to the cart by positioning the cart base beneath the backing surface and moving the backing surface to a retracted position wherein the stack drops onto the cart base and supported thereby.

28. A system as set forth in claim 27 wherein the second backing surface comprises a sliding door that slides in a direction transverse to the table surface.

29. A system as set forth in claim 28 further comprising a flap located between the conveyor surface and the table surface, the flap bridging a gap therebetween so that folded web material can pass from the conveyor to the table substantially free of interference by the gap.

30. A system as set forth in claim 29 wherein the flap is movable between an extended position that bridges the gap and a retracted position wherein the flap is free of engagement with the table so that the table can pivot to the substantially vertical position.

31. A system as set forth in claim 30 wherein the flap, in the retracted position, is positioned to block movement of the folded web material off of the conveyor surface.

32. A system as set forth in claim 27 wherein the pivot is constructed and arranged so that the table can be pivoted to a plurality of substantially vertical positions in which each of the first backing surface and the second backing surface are positioned at a bottom of the stack to support the stack.

33. A system as set forth in claim 27 wherein the support bracket comprises a vertical leg and a horizontal support leg, the horizontal support leg being positioned substantially along a side edge of the table so that the table pivots free of obstruction by the support bracket.

34. A system for substantially vertically stacking continuous zig-zag folded web comprising:

a conveyor having a conveyor surface that moves a continuous zig-zag folded web material in a downstream direction;

a table having a substantially planar table surface, the table being substantially in line with the conveyor surface and being adjacent the conveyor surface to receive the zig-zag folded web material from the conveyor;

a frame that supports the table, the frame including a support bracket;

a pivot located along the table and interconnected with the bracket, the pivot having a pivot axis substantially transverse to the downstream direction, the pivot constructed and arranged so that the table pivots from a substantially horizontal position, substantially in line with the conveyor surface, to a substantially vertical position wherein the table surface is substantially transverse to a plane defined by the conveyor surface;

a first backing surface extending substantially transversely to the table surface and located at a downstreammost end of the table that limits further downstream movement of the folded web material; and a second backing surface positioned at an upstreammost end of the table, the second backing surface extending transversely to the table surface and being movable between an extended position and a retracted position, the second backing surface being constructed and arranged so that, in a retracted position, the folded web passes thereover free of obstruction by the second backing surface, the second backing surface being constructed and arranged to support the folded web in a vertical stack, with the second backing surface positioned at a bottom of the stack when the table is pivoted to a substantially vertical position wherein the second backing surface can be retracted to allow the stack to drop onto an adjacent surface therebelow.

* * * * *

UNITED STATES PATENT AND TRADEMARK OFFICE
CERTIFICATE OF CORRECTION

PATENT NO. : 5,273,516

DATED : DECEMBER 28, 1993

INVENTOR(S) : H. W. CROWLEY

It is certified that error appears in the above-identified patent and that said Letters Patent is hereby corrected as shown below:

In claim 1, column 6, line 11, please delete "to".

In claim 1, column 6, line 13, after "folded", please insert --material--.

Signed and Sealed this

Twenty-third Day of August, 1994

Attest:

BRUCE LEHMAN

Attesting Officer   Commissioner of Patents and Trademarks